United States Patent [19]

Ammon

[11] Patent Number: 5,072,406
[45] Date of Patent: Dec. 10, 1991

[54] SELF-DEVELOPING COMPUTER SYSTEM

[76] Inventor: Kurt Ammon, Windmühlenweg 27, D-2000 Hamburg 52, Fed. Rep. of Germany

[21] Appl. No.: 477,889
[22] PCT Filed: Dec. 1, 1987
[86] PCT No.: PCT/DE87/00562
§ 371 Date: Apr. 16, 1990
§ 102(e) Date: Apr. 16, 1990
[87] PCT Pub. No.: WO89/05487
PCT Pub. Date: Jun. 15, 1989

[51] Int. Cl.⁵ .......................... G06F 15/18; G06F 9/44
[52] U.S. Cl. .......................................... 395/64; 395/77
[58] Field of Search ................................. 364/513, 200

[56] References Cited

U.S. PATENT DOCUMENTS

| | | | |
|---|---|---|---|
| 4,591,983 | 3/1986 | Bennett et al. | 364/403 |
| 4,670,848 | 6/1987 | Schramm | 364/513 |
| 4,853,873 | 8/1989 | Tsuji et al. | 364/200 |
| 4,868,763 | 9/1989 | Masui et al. | 364/513 |

Primary Examiner—Michael R. Fleming
Assistant Examiner—George Davis

[57] ABSTRACT

A computer system and process of operating a computer having a memory for storing knowledge which includes a reflection base and special knowledge. The reflection base contains complete instructions which can be executed by processors of known type and meta-knowledge about the instructions. The instructions provide components of new knowledge and the meta-knowledge is applied to the construction of compositions of the instructions. The special knowledge contains knowledge in a field of application. The special knowledge is changed and extended on the basis of the special knowledge itself wherein compositions of the instructions are constructed from the reflection base and the special knowledge, the execution of these compositions of instructions is controlled on the basis of the special knowledge, and components of the changed and extended special knowledge are generated from parts of the special knowledge and parts of the compositions of instructions. The outputs are produced with the aid of the changed and extended special knowledge.

28 Claims, 3 Drawing Sheets ized through self-development based on a manually given description of an example, a manually given theory of a field of application, and manually given criteria specifying efficient expressions in which the concept to be learned shall be represented (Mitchell, T. M., Keller, R. M., and Cedar-Cabelli, S. T., "Explanation-based generalization: A unifying view", *Machine Learning*, Vol. 1, No. 1, 1986, pp. 47-80). The LP system learns new methods for solving equations by a procedure called precondition analysis (Silver, B., "Precondition analysis: Learning control information", in R. S. Michalski, J. G. Carbonell, and T. M. Mitchell (Hrsg.), *Machine Learning: An Artificial Intelligence Approach*, Vol. II, Morgan Kaufmann, Los Altos, Calif., 1986). LP uses a manually given sophisticated syntax for his methods and begins with some fifteen methods (ibid., p. 651). The AM system discovered mathematical definitions and conjectures (Lenat, D. B., "AM: Discovery in mathematics as heuristic search", in D. B. Lenat und R. Davis, *Knowledge-Based Systems in Artificial Intelligence*, McGraw-Hill, New York, 1982). It is based on a set of manually given concepts, a set of manually given heuristic rules, and a detailed model of mathematical research developed by human experts (ibid., pp. 61-101, pp. 152-161, pp. 35-59, pp. 163-204, and pp. 147-149). The EURISKO system, which is a further development of AM, was also applied to fields outside of mathematics (Lenat, D. B., "EURISKO: A program that learns new heuristics and domain concepts", *Artificial Intelligence*, Vol. 21, 1983, pp. 61-98). It is also based on a set of manually given concepts, a set of manually given heuristic rules, and detailed models of the fields of application which were developed by human experts. Thus, learning systems are based on sophisticated manually developed methods and extensive complex knowledge which are also manually developed on the basis of a manual analysis of the fields of application. The complexity of the fields of application of conventional learning systems corresponds to the complexity of problems in high-school mathematics or the complexity of discoveries in elementary mathematics (Mitchell, T. M., Keller, R. M., and Cedar-Cabelli, S. T., "Explanation-based generalization: A unifying view", *Machine Learning*, Vol. 1, No. 1, 1986, pp. 61-64; Silver, B., "Precondition analysis: Learning control information", in R. S. Michalski, J. G. Carbonell, and T. M. Mitchell (Eds.), *Machine Learning: An Artificial Intelligence Approach*, Vol. II, Morgan Kaufmann, Los Altos, Calif., 1986, p. 647; Lenat, D. B., "AM: Discovery in mathematics as heuristic search", in D. B. Lenat und R. Davis, *Knowledge-Based Systems in Artificial Intelligence*, McGraw-Hill, New York, 1982, p. 7).

Outside of the field of machine learning, there were no successful attempts to develop theories, in particular, methods that can be executed by machines, for the construction of new knowledge (Simon, H. A., "Does scientific discovery have a logic?", *Philosophy of Science*, Vol. 40, No. 4, 1973, p. 474; Simon, H. A., and Newell, A., "Informationsverarbeitung und Problemösen", in G. Steiner (ed.), *Piaget und die Folgen*, Kindler, Zurich, Switzerland, 1978, p. 247). The object of these unsuccessful attempts was to develop such theories or methods manually. Well-known scientists such as A. Einstein, W. Heisenberg, and K. R. Popper

---

SELF-DEVELOPING COMPUTER SYSTEM

TECHNICAL FIELD

The invention relates generally to artificial intelligence, which is a subfield of computer science, and more specifically to a computer system and process of operating a computer that has a memory for storing knowledge, analyzes input signals, improves its efficiency by changing and extending the knowledge in its memory, and produces output signals on the basis of the changed and extended knowledge. The input signals can be generated by keyboards or sensors and the output signals can control printers, displays, or the movements of robots.

BACKGROUND ART

Conventional computer systems including robots are not able to improve their efficiency automatically by substantially changing and extending the programs or the knowledge in their memories (Feigenbaum, E. A., und McCorduck, P., *The Fifth Generation: Artificial Intelligence and Japan's Computer Challenge to the World*, Addison-Wesley, Menlo Park, Calif., 1983, p. 237). Such changes and extensions of the programs or the knowledge in machines are conventionally executed by human experts on the basis of an analysis of a field of application, that is, the programs or the knowledge are manually developed on the basis of a manual analysis of the field of application.

The ordinary use of conventional computer systems is that programs, which are compositions of elementary complete instructions, and data, which are to be processed by the programs, are loaded into their memories by means of input units, that the programs are applied to the data by means of processors, and that the final results are transmitted to output units.

The field of expert systems relates to development of computer systems having special knowledge in a field of application (Hayes-Roth, F., Waterman, D. A., and Lenat, D. B., *Building Expert Systems*, Addison-Wesley, London, 1983). An expert system consists of a knowledge base and an inference machine. The knowledge base contains knowledge in a field of application and the inference machine methods for applying this knowledge. The knowledge consists of facts in the field of application and heuristic rules containing experiental knowledge. The knowledge base and the inference machine are manually developed on the basis of a manual analysis of the field of application. In tightly restricted fields of application the efficiency of expert systems is comparable to that of human experts (ibid., p. 38). Two well-known expert systems are MYCIN and R1. MYCIN diagnoses blood deseases and offers advice for their therapy (Shortliffle, E. H., MYCIN: *Computer-Based Medical Consultations*, American Elsevier, New York, 1976). R1 generates configurations for the VAX computer system of Digital Equipment Corporation on the basis of customer orders. These configurations consist of diagrams which contain the spacial relations of the components in the orders (McDermott, J., "R1: A Rule-Based Configurer of Computer Systems", Technical Report CMU-CS-80-119, Computer Science Department, Carnegie-Mellon University, Pittsburg, Pa. 1980).

The field of machine learning has the object to develop computer systems that change and extend the knowledge in their memories. Some well-known learning systems are briefly described subsequently. Systems using a method called explanation-based learning transform a manually given inefficient definition of a concept to be learned into an efficient definition on the basis of supposed that there are no theories concerning the development of new knowledge, in particular, no mechanical methods for its construction (see Ammon, K., "The Automatic Development of Concepts and Methods", Doctoral Dissertation, University of Hamburg, 1988, p. 178).

The above overview of conventional computer systems, expert systems, learning systems, and other systems concerning the construction of new knowledge shows that these systems are based on manually developed theories which contain the programs, the methods, or the knowledge in these systems. These theories are developed on the basis of a manual analysis of a field of application. This means that there are non-elementary explicit theories of the processes that process information or generate new knowledge in these systems. This entails that the information in the inputs and the outputs these systems process, in particular, the relations between this information in the inputs and outputs, can completely be covered by explicit theories. Therefore, these systems have the disadvantages that they cannot by applied in complex fields that cannot completely be covered by given explicit theories and thus automatic changes and extensions of their theories, that is, their programs, their methods, and their knowledge, are required. For example, computer programs are developed by human experts in costly working processes. Therefore, conventional computer systems cannot be applied in fields that cannot completely be covered by explicit theories. Conventional expert systems and conventional learning systems also have these disadvantages: The extension of expert systems beyond the field of application originally contemplated by their designers is very difficult (McCarthy, J., "Some expert systems need common sense", *Annals of the New York Academy of Sciences*, Vol. 426, 1983, pp. 129-137) and the efficiency of learning systems decreases drastically after some period of time (Lenat, D. B., "AM: Discovery in mathematics as heuristic search", in D. B. Lenat und R. Davis, *Knowledge-Based Systems in Artificial Intelligence*, McGraw-Hill, New York, 1982, p. 7 und p. 135; Mitchell, T. M., "Learning and problem solving", *Proceedings of the Eighth International Conference on Artificial Intelligence*, Karlsruhe, West Germany, August 1983, Kaufmann, Los Altos, Calif.).

DISCLOSURE OF INVENTION

The object of the invention is to provide a user-friendly and economical computer system and process of operating a computer with a memory for storing knowledge that can also be used in fields that cannot completely be covered by given explicit theories and thus automatic changes and extensions of its knowledge are required.

According to the invention, this object is achieved by the computer system and process of operating a computer described subsequently. It processes input signals and finally generates output signals with the aid of the knowledge in its memory, wherein the input and the output signals represent information. It is called self-developing because it is able to generate new knowledge on the basis of more elementary knowledge. The knowledge in its memory contains a reflection base and special knowledge. The reflection base provides components, that is, building blocks, for representing new knowledge. It contains complete instructions, that is, these instructions can be executed by processors of known type. The instructions provide components, that is, building blocks, of new knowledge. Furthermore, the reflection base contains meta-knowledge about the instructions for constructing compositions of the instructions. Thus, the instructions and the meta-knowledge may be regarded as elementary with regard to these compositions because they provide components, that is, building blocks, of these compositions. The special knowledge contains knowledge in a field of application, that is, knowledge relating to a field of application in any sense, for example, facts, experiental knowledge, or methods that belong to the field or can be used in the field. The special knowledge provides a basis for changing and extending the special knowledge itself, that is, the special knowledge is applied to its own change and extension, which yields new special knowledge. This is achieved by constructing compositions of complete instructions from the reflection base and the special knowledge, controlling the execution of these compositions on the basis of the special knowledge, and generating components of the changed and extended special knowledge from parts of the previous special knowledge and parts of these compositions of instructions. This entails that part of the previous special knowledge and parts of these compositions of instructions form essential components of the changed and extended special knowledge, that is, the new special knowledge. In this sense, the previous special knowledge may be regarded as more elementary than the changed and extended special knowledge. Therefore, the special knowledge is not changed and extended on the basis of manually given exlicit methods. Rather, it is changed and extended through experience on the basis of previous special knowledge, that is, the special knowledge is applied as a method to its own change and extension. Thus, the processes changing and extending the special knowledge cannot completely be covered by a given explicit theory because the method for changing and extending the special knowledge is generated by the self-developing computer system or process itself from more elementary special knowledge. The indeterminacy of these processes is essentially caused by the fact that they generate new knowledge on the basis of more elementary knowledge (see Ammon, K., "The Automatic Development of Concepts and Methods", Doctoral Dissertation, University of Hamburg, 1988, pp. 80-83, pp. 150-151, pp. 174-175, and p. 178). The scientific theory which forms the basis for the self-developing computer system and process is presented in the dissertation given above. The self-developing computer system or process generates output signals with the aid of the changed and extended special knowledge, for example, it can directly output changed and extended special knowledge or it can apply changed and extended special knowledge to generate output signals from input signals.

The special knowledge in a field of application can comprise knowledge components containing knowledge in subfields of a field of application, that is, these knowledge components relate to subfields of the field of application in any sense. If knowledge components are not available for input signals, that is, for a field of application or a subfield of a field of application, knowledge components are generated for subsets of the input signals on the basis of the reflection base, wherein these knowledge components for example contain elementary knowledge about these subsets or arise from parts of available knowledge components by adding elementary knowledge. I call this construction of new knowledge components division. The self-developing computer system or process can integrate available knowledge components, that is, to compose them into a single knowledge component. I call this integration of available knowledge components unification. Thus, the self-developing computer system or process can change and extend its special knowledge by division and unification processes of knowledge components. The processes changing and extending the special knowledge can contain simplification processes that separate essential knowledge from inessential knowledge and thus filter out essential knowledge. For example, the system can accomplish this by generating variations of special knowledge by tentatively deleting parts of the special knowledge and then testing whether the variations have an efficiency comparable to that of the original special knowledge. If this is true, these parts of the special knowledge are deleted definitively. The reflection base can contain a universal set of elementary complete instructions, from which all other complete instructions can be composed, and meta-knowledge about these instructions. This means that these instructions and this meta-knowledge are largely domain-independent, that is, largely independent of fields of application. The self-developing computer system or process can change and extend the special knowledge in a feedback process on the basis of special knowledge it itself has changed and extended. The change and extension of special knowledge in the self-developing computer system or process can obey the principle of economy, that is, the self-developing computer system or process tends to change and extend its special knowledge in such a manner that the amount of the resources required for the application of the changed and extended special knowledge tends to decrease. For example, this means that previously unsolvable problems can be solved with the available resources and that the amount of the resources required for solving problems tends to decrease. For example, the self-developing computer system or process can accomplish this by generating variations of new special knowledge on the basis of more elementary special knowledge and the reflection base and then selecting the most efficient variations, for example, the variations that have the largest scope of application or require less resources. For example, the generation of such variations can be accomplished by unifying two knowledge components in the special knowledge into a new knowledge component which is a variation of the original knowledge components or by generating variations of knowledge components by deleting parts of these knowledge components or inserting parts of other knowledge components into them. The self-developing computer system or process can analyze failures in the application of the special knowledge and correct the special knowledge so that the failures are avoided. For example, it can analyze errors or inefficiencies in its special knowledge, therefore change and extend this knowledge, and test and confirm the correctness or efficiency of the changed and extended knowledged by applying this changed and extended knowledge. The self-developing computer system or process can determine functional values of non-computable functions, that is, functions that cannot be represented by given computer programs. This determination is accomplished in the same way as the self-developing computer system or process generates new special knowledge including computer programs. The special knowledge can contain complete instructions and meta-knowledge about these instructions from the reflection base and the self-developing computer system or process can change and extends these instructions and this meta-knowledge. Thus, it can for example generate complete instructions and meta-knowledge about these instructions that are not contained in the reflection base. The system can be a subsystem of any computer system. It can contain one or several reflection bases in one or several memories of one or several computer systems and the generation of new knowledge can be executed in several processes. The special knowledge can contain compositions of complete instructions from the reflection base and the self-developing computer system or process can change and extend these compositions of complete instructions. For example, such compositions can be computer programs. Thus, the self-developing computer system or process develops new computer programs. The self-developing computer system or process can contain a procedure that generates objects satisfying a given description by producing a set of objects from this description and selecting objects from this set that satisfy the description.

In an initialization stage, special knowledge is manually put into the self-developing computer system or process until it is able to change and extend its knowledge on the basis of more elementary knowledge and to process input signals and generate output signals on the basis of its changed and extended knowledge, wherein the input and output signals need not be completely coverable by given explicit theories.

BEST MODE FOR CARRYING OUT THE INVENTION

A detailed description of the best mode for carrying out the invention is given below. It should be understood, however, that it is not intended to limit the invention to the particular form disclosed, but on the contrary, the intention is to cover all modifications, equivalents, and alternatives falling within the spirit and scope of the invention as defined by the appended claims.

Figure 1:
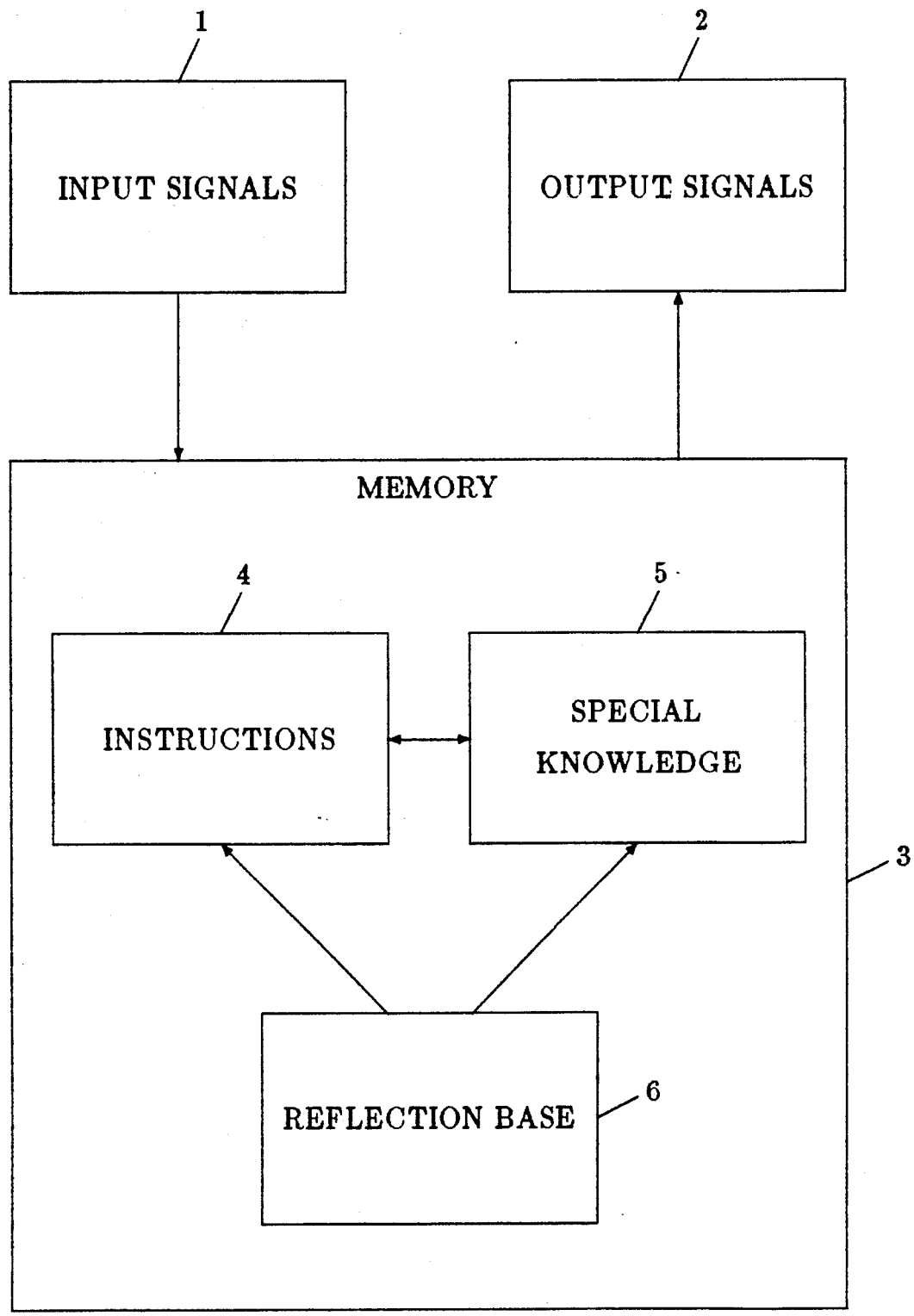
FIG. 1 shows the interaction of the most important functional units in the memory of a self-developing computer system or process.

FIG. 1 shows the most important functional units in a memory 3 of a self-developing computer system. The input signals 1, which are transmitted from input units or other computer systems, are processed by means of the knowledge in the memory 3. Thus, output signals, which are transmitted to output units or other computer systems, are generated. For example, the input units can be keyboards or sensors and the output units printers, displays, or the arms of robots. The memory 3 contains compositions of elementary complete instructions 4, that is, these instructions can be executed by conventional processors. For example, such an instruction may generate new lists from original lists by reversing the order of the members in the original lists. Furthermore, the memory 3 contains knowledge which includes special knowledge 5 and a reflection base 6. The special knowledge 5 contains knowledge that belongs to a field of application or can be applied in the field. For example, the special knowledge can contain spatial knowledge and methods to apply this knowledge to the movement of objects. The special knowledge is domain-specific, that is, its structures are largely determined by their fields of application. A part of the knowledge can be represented in a form that is similar to subsets of natural languages. The reflection base 6 contains elementary complete instructions and elementary meta-knowledge about these instructions. For example, the reflection base 6 may contain an instruction that inverts the order of the members in a list and the knowledge that the repeated application of this instruction to a list yields the original list. The reflection base 6 can be largely domain-independent, that is, largely independent of fields of application because there are limited sets of elementary complete instructions from which all complete instructions can be composed and the elementary meta-knowledge about these instructions is also limited.

Figure 2:
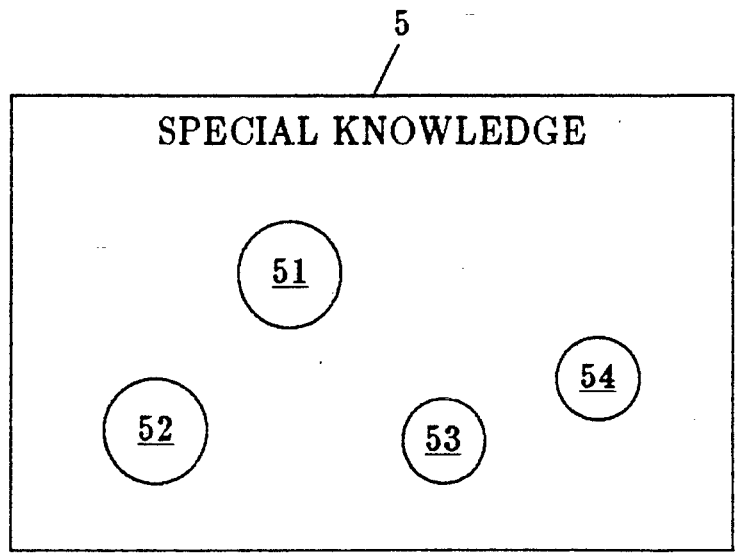
FIG. 2 exemplarily shows the structure of the special knowledge which is composed of knowledge components.
Figure 3:
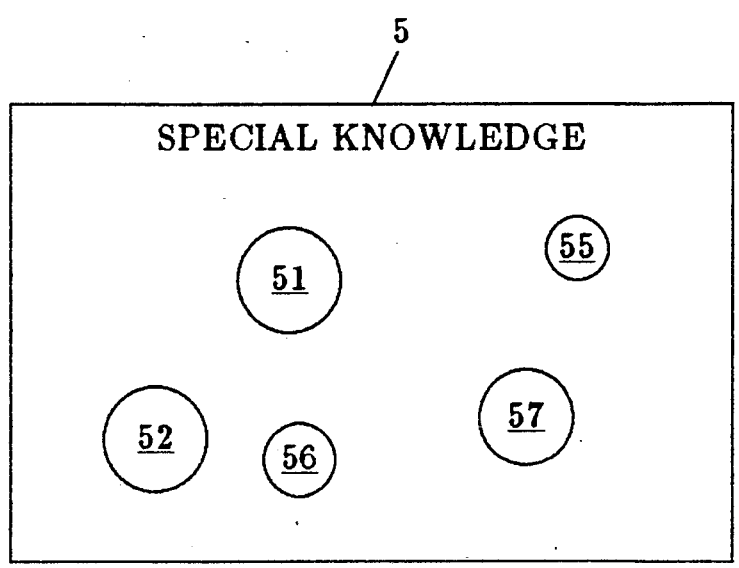
FIG. 3 exemplarily shows the structure of the special knowledge in FIG. 2 at a later point of time.
Figure 4:
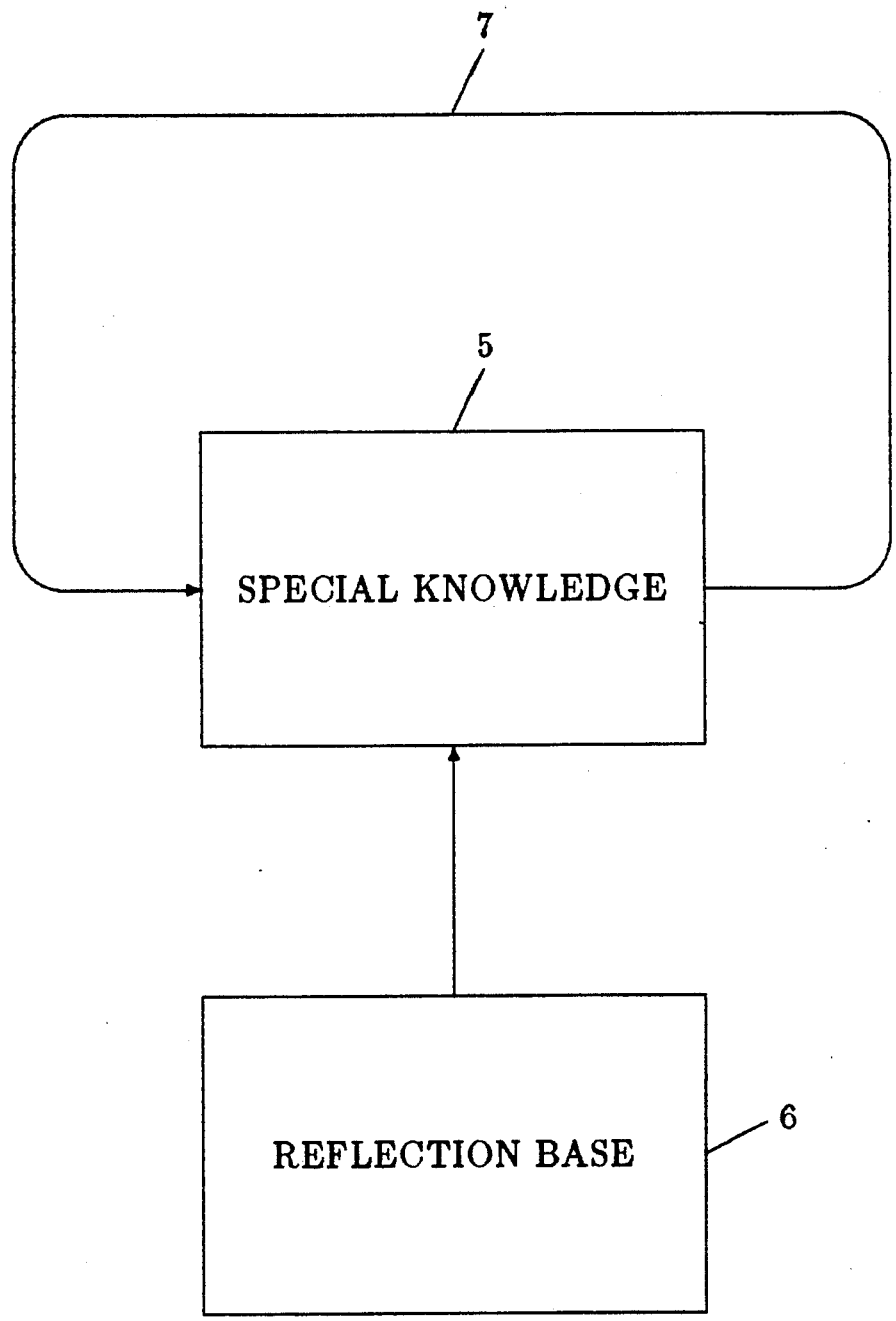
FIG. 4 shows the development of the special knowledge in a self-developing computer system or process on the basis of its reflection base. This development is controlled by a feedback process.

The mode of operation of a self-developing computer system is to process the input signals 1 by means of the special knowledge 5 and the reflection base 6 and to generate output signals as a final result. The input and output signals of a self-developing computer system need not be completely coverable by theories. The processing of the input signals 1 is achieved by generating compositions of elementary complete instructions on the basis of the special knowledge 5 and the reflection base 6 and then executing these instructions. The execution of these instructions is controlled by the special knowledge 5. FIG. 2 exemplarily shows the structure of the special knowledge 5 which consists of the knowledge components 51, 52, 53, and 54, that is, these components relate to specific subfields of a field of application. FIG. 4 illustrates the generation of new special knowledge 5. A self-developing computer system changes and extends its special knowledge 5 in a feedback process 7 on the basis of available, more elementary special knowledge 5. The new special knowledge can again be applied to its own change and extension. Thus, a self-developing computer system does not change and extend its special knowledge 5 on the basis of manually given, explicit methods or knowledge bases. Rather, it changes and extends its special knowledge 5 in a feedback process 7 on the basis of more elementary knowledge. If no special knowledge 5 is available for a field of application, a self-developing computer system generates elementary special knowledge 5 for this field on the basis of the reflection base 6. The changes and extensions of the special knowledge 5 are characterized by division and unification processes of knowledge components. FIG. 3 exemplarily shows the structure of the special knowledge 5 in FIG. 2 at a later point of time. The knowledge components 51 and 52 are unchanged. The knowledge components 55, 56, and 57 are new: The knowledge components 55 and 56 result from division processes and the knowledge component 57 results from a unification process. The knowledge component 55 contains elementary special knowledge 5 about new input signals. A self-developing computer system generates such a knowledge component if no knowledge component is available for new input signals. The knowledge component 56 contains parts of the knowledge component 52. Such a knowledge component is generated if parts of an available knowledge component can be used for processing new input signals. The knowledge component 57 results from a unification of the knowledge components 53 and 54. The knowledge components resulting from such unification processes more efficiently perform the function of the knowledge components from which they arise.

Now, the structure and the mode of operation of a self-developing computer system are illustrated by an example in the field of mathematics. The example describes how a self-developing computer system analyzes a proof of a simple theorem and thus generates special knowledge which contains methods for the generation of other proofs. In this way, the example shows how such a system develops special knowledge by processing input signals and uses this knowledge to solve problems it could not solve previously. Mathematical proofs and the function determining whether a mathematical proposition is true or false cannot completely be covered by given explicit theories (Ammon, K., "The Automatic Development of Concepts and Methods", Doctoral Dissertation, University of Hamburg, 1988). The field of mathematics was chosen because it makes a compact illustration of a simple and efficient self-developing computer system possible.

The example applies a functional representation of instructions. Therefore, instructions are often called functions or forms, the execution of instructions is called evaluation, and the result of the execution of instructions is called value. This functional representation is also applied to the representation of knowledge.

Mathematical axioms and theorem. The example belongs to group theory. The axiomatization used here requires that linear equations are solvable. It departs from the usual axiomatization for which linear equation solvability is a theorem. A group is a set with three binary operations, that is, these operations assign exactly one element of the set to each pair of elements of the set. The first operation is called group operation. The element assigned to two elements x and y is written as xy for the group operation, as $g(x,y)$ for the second operation, and as $h(x,y)$ for the third operation. The following mathematical axioms hold for a group:

| | |
|---|---:|
| $(xy)z = x(yz)$ | 1. |
| $g(x,y)x = y$ | 2. |
| $xh(x,y) = y$ | 3. |

An example of a group is the set of the rational numbers with multiplication as the group operation and two further operations g and h assigning the rational number y/x to each pair of rational numbers x and y. The theorem is: For all elements a and b of a group, the equation $$g(a,a)b = b$$

holds. The theorem implies that there is a left identity in a group. In the computational representation of the axioms and the theorem, $(= x\ y)$ stands for the equation $x = y$ and $(f\ x\ y)$, $(g\ x\ y)$ and $(h\ x\ y)$ for the terms xy, $g(x,y)$, and $h(x,y)$, where x and y are terms. In order to improve the readability of this description, the equations obtained by exchanging the left and right sides of the axioms are added to the axioms. Thus, the computational representation of the axioms is:

```
(set (= (f (f x y) z) (f x (f y z)))
     (= (f x (f y z)) (f (f x y) z))
     (= (f (g x y) x) y)
     (= y (f (g x y) x))
     (= (f x (h x y)) y)
     (= y (f x (h x y)))).
```

The computational representation of the theorem is (=(f(g a a)b)b).

Proof. A proof in ordinary representation for the theorem g(a,a)b=b consisting of four proof steps is:
1. Because of Axiom 3, the equation g(a,a)b=g(a,a)(ah(a,b)) holds.
2. Because of Axiom 1, the equation g(a,a)(ah(a,b))=(g(a,a)a)h(a,b) holds.
3. Because of Axiom 2, the equation (g(a,a)a)h(a,b)=ah(a,b) holds.
4. Because of Axiom 3, the equation ah(a,b)=b holds.
Because of the transivity of the equality relation, the equations given above yield the equation g(a,a)b=b. This completes the proof. The computational representation of the proof is

```
(tuple (pair   (= (f (g a a) b) (f (g a a) (f a (h a b))))
               (chain-rule (f (g a a) b)
                           2
                           (= y (f x (h x y)))
                           (set a/x b/y)))
       (pair   (= (f (g a a) (f a (h a b))) (f (f (g a a) a) (h a b)))
               (chain-rule (f (g a a) (f a (h a b)))
                           0
                           (= (f x (f y z)) (f (f x y) z))
                           (set (g a a)/x a/y (h a b)/z)))
       (pair   (= (f (f (g a a) a) (h a b)) (f a (h a b)))
               (chain-rule (f (f (g a a) a) (h a b))
                           1
                           (= (f (g x y) x) y)
                           (set a/x a/y))))
       (pair   (= (f a (h a b)) b)
               (chain-rule (f a (h a b))
                           0
                           (= (f x (h x y)) y)
                           (set a/x b/y)))).
```

The proof is a tuple containing four proof steps which are represented as pairs. The first member of a proof step is an equation and the second member contains a rule of inference chain-rule and arguments for this rule. The equations in the first members of the proof steps are the equations of the proof in ordinary representation given above. The first argument of the chain rule chain-rule in the second member of a proof step is a term, the second argument a pointer to a subterm of this term, the third argument an equation, and the fourth argument a substitution for the variables of this equation. The application of the substitution to the equation yields an equation whose left term is equal to the subterm of the term in the first argument the pointer points to. The application of the chain rule chain-rule to its arguments yields an equation whose left side is equal to the term in the first argument and whose right side is obtained by replacing the subterm of this term the pointer points to by the right side of the equation obtained by applying the substitution in the fourth argument to the equation in the third argument. An example is: The first argument of the chain rule in the first proof step is the term (f(g a a)b), the second argument is the pointer 2, which points to the subterm b of this term, the third argument is the equation (=y(f x(h x y))), and the fourth argument is the substitution (set a/x b/y), which describes the substitution of the element a for the variable x and the substitution of the element b for the variable y. The application of this substitution to the equation in the third argument yields the equation (=b(f a(h a b))). Thus, the application of the chain rule chain-rule to the arguments given above yields the equation (=(f(g a a)b) (f(g a a) (f a(h a b)))).

Method. A method generating the proof from the axioms and the theorem is the function

```
(function method (axioms theorem)
    (assign '(tuple) to partial-proof)
    (loop if (contains-proof: theorem partial-proof)
              then
              (return (extract-proof theorem partial-proof)))
          (append the elements of
                  (last-nonempty-set
                      (set-of s
                              (and (proof-step: s)
                                   (equal: (arg '(2 0) s) 'chain-rule)
                                   (equal: (arg '(2 1) s) (arg 1 theorem))
                                   (element: (arg '(2 3) s) axioms)
                                   (subset: (substituents (arg '(2 4) s))
                                            (variables theorem))))
                      (set-of s
                              (and (proof-step: s)
                                   (equal: (arg '(2 0) s) 'chain-rule)
                                   (element: (arg '(2 1) s) (projection '(1 2) partial-proof))
                                   (element: (arg '(2 3) s) axioms)
                                   (subset: (variables (arg 2 (arg '(2 3) s)))
                                            (variables (arg 1 (arg '(2 3) s))))
                                   (not (element: (arg '(1 2) s)
                                                  (projection '(1 1) partial-proof))))))
                  to the partial-proof))).
```

The method method is a binary function whose first argument is a set of axioms axioms and whose second argument is a theorem therorem. The method consists of an assign form and a loop form which are executed in the given order. It uses the variable partial-proof which contains a tuple of proof steps. The assign form assigns the empty tuple (tuple) to the variable partial-proof. The loop form consists of an if form and an append form which are executed in the given order until the condition in the first argument of the if form is satisfied. This condition tests whether the partial proof contains a proof of the theorem, that is, whether the theorem can be derived from the first members of the proof steps on the basis of the transivity of the equality relation. The colon as the last character of a function name indicates that the function is a predicate, that is, its evaluation yields the value true or false. If the condition described above is satisfied, the function extract-proof deletes the proof steps that are not necessary and hence superfluous for the proof and returns the proof contained in the partial proof as the result of the function method. If the condition in the contains-proof: form is not satisfied, the append form is executed, which appends the elements of the set generated by the last-nonempty-set form to the partial proof. The last-nonempty-set form consists of two set-of forms which construct the set of all objects satisfying the conditions in their second arguments. First, the second set-of form is executed. If it yields a nonempty set, this set is the value of the last-nonempty-set form. Otherwise, the first set-of form is executed and the resulting set is the value of the last-nonempty-set form. The first set-of form generates the set of all objects s satisfying the following conditions:

1. The object s is a proof step.
2. The rule of inference in the second member of the proof step s is the chain rule. (A detailed definition of the function arg is given in the appendix.)
3. The first argument of the chain rule is equal to the first argument of the theorem, that is, to its left side.
4. The third argument of the chain rule is an axiom.
5. The substituents of the substitution in the fourth argument of the chain rule are variables contained in the theorem.

Roughly speaking, the first set-of form generates the set of all equations whose left side is equal to the left side of the theorem and whose right sides are generated on the basis of substitutions whose substituents are variables contained in the theorem. The second set-of form generates the set of all objects s satisfying the following conditions:

1. The object s is a proof step.
2. The rule of inference in the second member of the proof step s is the chain rule.
3. The first argument of the chain rule is equal to the second term in the first member of a proof step. (A detailed definition of the function projection is given in the appendix.)
4. The third argument of the chain rule is an axiom.
5. The variables in the second argument of the equation in the third argument of the chain rule are contained in the first argument of this equation.
6. The second argument in the first member of the proof step s is not the first argument in the first member of a proof step in the partial proof.

Roughly speaking, the second set-of form generates the set of all equations whose left side is equal to the right side of an equation in the partial proof and whose right side is not longer than its left side and not contained in the partial proof. The application of the method to the axioms and the theorem yields eighteen proof steps whose first members are given in the following table:

| First set-of form | Second set-of form | | | |
|---|---|---|---|---|
| g(a, a)b = g(g(a, a)a, a)b | | | | |
| g(a, a)b = g(g(b, a)b, a)b | | | | |
| g(a, a)b = g(a, g(a, a)a)b | | | | |
| g(a, a)b = g(a, g(b, a)b)b | | | | |
| g(a, a)b = g(a, a)(g(a, b)a) | ... = (g(a, a)g(a, b))a | | | |
| g(a, a)b = g(a, a)(g(b, b)b) | ... = (g(a, a)g(b, b))b | | | |
| g(a, a)b = g(ah(a, a), a)b | | | | |
| g(a, a)b = g(bh(b, a), a)b | | | | |
| g(a, a)b = g(a, ah(a, a))b | | | | |
| g(a, a)b = g(a, bh(b, a))b | | | | |
| g(a, a)b = g(a, a)(ah(a, b)) | ... = (g(a, a)a)h(a, b) | ... = ah(a, b) | ... = b |
| g(a, a)b = g(a, a)(bh(b, b)) | ... = (g(a, b)h(b, b) | | | |

In each case, the points stand for the right sides of the equations in the same line of the preceding column. The equations required for the proof are underlined. The equations in the first column are generated by the first set-of form in the method and the equations in the other columns by the second set-of form. The first six equations in the first column arise by applying the second axiom and the other equations in the first column by applying the third axiom. The equations in the second column arise by applying the first axiom, the equation in the third column by applying the second axiom, and the equation in the fourth column by applying the third axiom. The generation of the eighteen proof steps by the set-of forms in the method is described in the following paragraph.

The set-of function. The set-of function is a binary function whose first argument is a variable and whose second argument is a conjunction containing this variable. It generates the set of all objects satisfying the conditions in the arguments of the conjunction. This is accomplished in three steps. The first step applies the axioms in the reflection base to the conjunction which yields additional conditions. The second step replaces element relations between parts of the objects to be generated and finite sets by equality relations between the parts and the elements of these sets. The third step evaluates the conjunctions generated in the second step. If conditions in the arguments of such a conjunction are not satisfied, this conjunction is deleted. Otherwise, an object satisfying the conditions in the arguments of this conjunction is generated. The objects thus generated are exactly the objects satisfying the conditions in the arguments of the original conjunction. The evaluation of the first set-of form in the method is described subsequently. The reflection base contains the axioms

```
(for-all x
    (if (and (proof-step: x)
             (equal: (arg '(2 0) x) 'chain-rule)
        then
        (and (term: (arg '(2 1) x))
```

```
                    (element: (arg '(2 2) x) (subterm-pointers (arg '(2 1) x)))
                    (equation: (arg '(2 3) x))
                    (substitution: (arg '(2 3) x) (arg '(2 4) x))
                    (equal:  (arg (arg '(2 2) x) (arg '(2 1) x))
                             (arg 1 (substitute (arg '(2 3) x) (arg '(2 4) x))))
                    (equal: (arg 1 s) (apply (arg 2 s))))))
and
        (for-all  e s t m
             (if  (and  (equation: e)
                        (substitution: e s)
                        (equal: t (arg 1 (substitute e s)))
                        (subset: (substituents s) m))
                  then
                        (element: s (generate-substitutions t e m)))).
```

The first axiom describes the arguments of the rule of inference chain-rule. Furthermore, it states that the first member of a proof step is generated by applying the chain rule to the arguments in the second member. The second axiom states: If s is a substitution for the variables of an equation e, t the left side of the equation obtained by applying s to g, and the substituents of s are contained in a set of terms m, then s is contained in the set of substitutions generated by matching the left side of e with t and binding the variables of e that are not contained in the resulting substitution by terms contained in m. For example, the value (generate-substitutions 'b'(=y(f x(h x y))) '(set a b))

is the set of substitutions (set (set a/x b/y) (set b/x b/y)).

The application of the two axioms to the first set-of form in the method yields the set-of form

```
(set-of  s
         (and  (proof-step: s)
               (equal: (arg '(2 0) s) 'chain-rule)
               (equal: (arg '(2 1) s) (arg 1 theorem))
               (element: (arg '(2 3) s) axioms)
               (subset: (substituents (arg '(2 4) s)) (variables theorem))

(term: (arg '(2 1) s))
               (element:  (arg '(2 2) s) (subterm-pointers (arg '(2 1) s)))
               (equation: (arg '(2 3) s))
               (substituent: (arg '(2 3) s) (arg '(2 4) s))
               (equal:  (arg (arg '(2 2) s) (arg '(2 1) s))
                        (arg 1 (substitute (arg '(2 3) s) (arg '(2 4) s))))
               (equal: (arg 1 s) (apply (arg 2 s)))
               (element:  (arg '(2 4) s)
                          (generate-substitutions  (arg (arg '(2 2) s) (arg '(2 1) s))
                                                   (arg '(2 3) s)
                                                   (variables theorem))))).
```

The box encloses the arguments of the conjunction added by the application of the two axioms. The second step replaces the equality relations in the fourth, seventh, and twelfth argument of the conjunction by equality relations to the elements of the corresponding sets. For example, the first element relation (element: (arg '(2 3)s) axioms)

is first replaced by the equality relation (equal: (arg '(2 3)s) '(=(f(f x y)z(f x(f y z)))).

The third step evaluates the arguments of the resulting conjunctions. Exactly twelve conjunctions do not contain arguments whose value is false. Because they describe all parts of proof steps, a set of twelve proof steps can be generated from them immediately. This set is the value of the first set-of form in the method. The evaluation of the second set-of form is accomplished analogously, wherein the axiom

```
(for-all e s t
     (if (and  (equation: e)
               (substitution: e s)
               (equal: t (arg 1 (substitute e s)))
               (subset: (variables (arg 2 e)) (variables (arg 1 e)))
          then
               (equal: s (match t (arg 1 e))))))
``` is applied instead of the second axiom. The axiom given above states: If s is a substitution for the variables of an equation e, t the left term of the equation obtained by applying s to e, and the variables in the right side of e are contained in the left side of e, then s is generated by matching the left side of e with t.

A self-developing analysis procedure. This section describes an analysis procedure which produces the method from the axioms, the theorem, and the proof. The proof steps of the proof are analyzed one by one. The proof step presently being analyzed is subsequently called current proof step. The analysis procedure is an iteration procedure whose iteration variables are a pointer to the current proof step, a partial proof, and a partial method. At the beginning the pointer is 1, the partial proof is the empty tuple (tuple), and the partial method is the function

```
(function partial method (axioms theorem proof pointer)
     (assign  '(tuple) to partial-proof)
     (loop    (if (subset: (up-to-nth proof pointer) partial-proof)
```

```
        then
            (return partial-proof))
        (append the elements of
            (last-nonempty-set)
            to the partial-proof))).
```

The arguments of the function partial-method are a set of axioms, a theorem, a proof, and a pointer to a proof step. First, the partial method assigns the empty tuple (tuple) to the variable partial-proof. Then, the if form and the append form are repeatedly executed in the given order until the condition in the if form is satisfied. The if form tests whether the proof steps in the proof up to the proof step the pointer points to are contained in the partial proof. If this is true, the partial proof is returned. Otherwise, the append form is executed. It appends the elements of the last-nonempty-set form to the partial proof. This completes the description of the initial values of the iteration variables. The iteration step, that is, the analysis of a single proof step, has six stages:

1. Application of the partial method. This stage multiples the evaluation time of the form

```
(partial-method axioms theorem proof pointer-1),
``` where the value of the variable pointer-1 is the value of the pointer diminished by one, by a number greater than one such as two or four, which yields a time interval. If the evaluation of the form

```
(partial-method axioms theorem proof pointer)
``` within this time interval yields a set of proof steps containing the current proof step, that is, the proof step the pointer points to, the sixth stage of the iteration step is executed. Otherwise, the second stage is executed.

2. Elementary analysis. This stage generates a set-of form

```
(set-of  s
    (and  (proof-step: s)
          (equal: (arg '(2 0) s) 'chain-rule)
          ...)).
```

The arguments of the conjunction are generated on the basis of initial statements and axioms. These axioms are contained in the reflection base. They contain knowledge for the construction of new statements. The statements state the membership of objects. A subset of the statements designate propositions. The initial statements are the arguments of the conjunction in the set-of form given above or they state the membership of the given objects. An example of an initial statement stating the membership of a given object is the knowledge that the given theorem is an equation. The axioms describe the domains and ranges of the elementary functions that can occur in set-of forms. An example of an axiom is the knowledge that the left side of an equation is a term. An example of an axiom yielding a proposition is the knowledge that the equality relation between two terms forms a proposition. The application of the axioms in the reflection base to the given statements yields new generations of statements which are added to the existing statements. The propositions designated by new statements of a generation are processed as follows: The variable s is replaced by the proof step the pointer points to and the resulting proposition is evaluated. If its value is false, the next proposition designated by a statement is evaluated. If its value is true, the proposition is appended to the arguments of the conjunction in the set-of form given above. If, after all propositions are processed, the evaluation of the resulting set-of form yields a set of proof steps within a given time interval such as ten minutes, the third stage of the iteration step is executed. Otherwise, a new generation of statements is generated.

3. Simplification. The conjunction in the set-of form generated by the preceding stage contains unessential arguments. Therefore, the system multiples the execution time of this set-of form by a number greater than one, for example, two or four, which yields a time interval. Then, it tentatively removes one argument at a time from the conjunction and evaluates the resulting set-of form. If this yields a set of proof steps within the time interval, the corresponding argument is definitively removed from the conjunction. Thus, this procedure produces a set-of form from whose conjunction no argument can be removed, that is, the conjunction finally contains only essential arguments.

4. Unification. If the partial method does not contain a set-of form, the fifth stage of the iteration step is executed. Otherwise, this stage attempts to unify the set-of form produced by the third stage and the last set-of form in the partial method into a set-of form

```
(set-of  s
    (and  (proof-step: s)
          (equal: (arg '(2 0) s) 'chain-rule)
          ...))
``` which performs the function of the two original set-of forms. First, the value of the form

```
(partial-method axioms theorem proof pointer-2),
``` where the value of the variable pointer-2 is the value of the pointer diminished by two, is assigned to the variable partial-proof, that is, this variable is reset to the value it had in the analysis of the proof step before the current proof step. The unification is accomplished in three substages:

(a) Analogously to the elementary analysis, generations of statements are generated by means of the axioms in the reflection base. The knowledge that the arguments of the conjunctions in the original set-of forms are propositions is used in the form of additional initial statements. Then, Substage (b) is executed.

(b) The statements from Substage (a) designating propositions are processed one by one. If no more statements are available, a new generation of statements is produced according to Substage (a). The processing of these statements is accomplished as follows: The variable s in the proposition is replaced by the proof step before the current proof step and the resulting proposition is evaluated. If its truth value is false, the next proposition designated by a statement is processed. If its truth value is true, the current proof step is substituted for the variable s in the proposition and the resulting proposition is evaluated. If its value is false, the next proposition designated by a statement is evaluated. If its value is true, the proposition is appended to the arguments of the conjunction in the set-of form given above. If the evaluation of the resulting set-of form yields a set of proof steps within a given time interval such as ten minutes, this set of proof steps is tentatively appended to the partial proof. If another evaluation of the set-of form within this time interval yields a set of proof steps containing the current proof step, Substage (c) is executed. Otherwise, the next proposition designated by a statement is processed. If the execution time of this stage is greater than the sum of the execution times that were required for the generation of the set-of forms to be unified multiplied by a number greater than one, the fifth stage of the iteration step is executed.

(c) Analogously to the set-of form generated in the elementary analysis, the conjunction in the set-of form produced by Substage (b) contains unessential arguments. Therefore, the system multiplies the sum of the execution times of this set-of form and the set-of form obtained by tentatively appending the proof steps produced by the evaluation of this set-of form to the partial proof by a number greater than one such as two or four, which yields a time interval. Then, it tentatively removes one argument at a time from the conjunction and evaluates the resulting set-of form. If this yields a set of proof steps within the time interval, these proof steps are tentatively appended to the partial proof. If another evaluation of the set-of form within this time interval yields a set of proof steps containing the current proof step, the corresponding argument is definitively removed from the conjunction. Thus, this procedure produces an set-of form from whose conjunction no argument can be removed, that is, the conjunction finally contains only essential arguments. When all arguments of the conjunction in the set-of form are processed, the last set-of form in the partial method is replaced by this set-of form and the sixth stage of the iteration step is executed.

5. Division. The set-of form generated by the third stage of the iteration step is inserted as the last argument of the last-nonempty-set form in the partial method. Then, the sixth stage is executed.

6. Update of the iteration variables and exit. If the pointer points to the last proof step, the if form in the partial method is replaced by the if form in the method which yields the method. Otherwise, the iteration variables partial-proof and pointer are updated. The value of the form (partial-method axioms theorem proof pointer)

is assigned to the variable partial-proof and the value of the variable pointer is increased by one. Then, the first stage of the iteration step is repeated.

The control of the analysis procedure by time intervals serves for the automatic adaption of this procedure to the complexity of the proof.

A trace of the analysis process. This section describes a trace of the analysis process which is produced by the application of the self-developing analysis procedure to the axioms, the theorem, and the proof.

1. An elementary analysis. The application of the initial method to the axioms, the theorem, the proof, and the pointer 1 yields the empty tuple. Therefore, an elementary analysis is executed. The elementary analysis and the simplification stage for the first proof step yield a set-of form which is identical with the first set-of form in the method. The generation of the third argument (equal: (arg '(21)s) (arg 1 theorem))

in the conjunction of this set-of form is described subsequently. An initial statement is (equation: theorem), which says that the theorem is an equation. The application of the first axiom in the reflection base, which describes the arguments of the rule of inference chain-rule, to the initial statements among other things yields the statement (term: (arg '(2 1)s)), which says that the first argument of the chain rule in a proof step s is a term. The reflection base contains the axiom

| (for-all | x | |
| | (if | (equation: x) |
| | | then |
| | | (term: (arg 1 x )))), | which says that the left side of an equation is a term. This axiom is applied to the statement (equation: theorem), which yields the statement (term: (arg 1 theorem)).

Furthermore, the reflection base contains the axiom

| (for-all | x y | |
| | (if | (and (term: x) (term: y)) |
| | | then |
| | | (proposition: (equal: x y))), | which says that the equality relation between two terms forms a proposition. The application of this axiom to the above statements, which designate terms, yields the statement (proposition: (equal: (arg '(2 1)s) (arg 1 theorem))), which designates the proposition (equal: (arg '(2 1)s) (arg 1 theorem)).

The first proof step is substituted for the variable s in this proposition. The evaluation of the resulting proposition yields the truth value true so that this proposition is appended to the arguments of the conjunction in the set-of form.

2. A simplification process. The conjunction in the set-of form generated by the elementary analysis contains unessential arguments, for example, the argument (equal: (arg 1 theorem) (arg 1 theorem)), which says that the left side of the theorem is equal to itself. The deletion of such arguments yields the first set-of form in the method. This set-of form is inserted into the initial method as an argument of the last-nonempty-set form.

3. A division process. The application of the resulting partial method to the axioms, the theorem, the proof, and the pointer 2 does not produce the second proof step. The elementary analysis and the simplification stage for the second proof step yield the set-of form

```
(set-of s
    (and (proof-step: s)
         (equal: (arg '(2 0) s) 'chain-rule)
         (element: (arg '(2 1) s) (projection '(1 2) partial-proof))
         (element: (arg '(2 3) s) axioms)
         (same-set:  (variables (arg 2 (arg '(2 3) s)))
                     (variables (arg 1 (arg '(2 3) s))))))).
```

Because the unification stage fails, this set-of form is inserted into the last-nonempty-set form as its last argument.

4. A unification process. The application of the resulting partial method to the axioms, the theorem, the proof, and the pointer 3 does not produce the third proof step. The elementary analysis and the simplification stage for the third proof step yield a set-of form that is identical with the second set-of form in the method. The unification of this set-of form and the second set-of form in the partial method yields this set-of form again because the substitution of the second proof step for the variable s in the arguments

```
(subset:  (variables (arg 2 (arg '(2 3) s)))
          (variables (arg 1 (arg '(2 3) s))))
``` and

```
(not (element:  (arg '(1 2) s)
                (projection '(1 1) partial-proof)))
``` of the conjunction in this set-of form produces propositions whose evaluation yields the truth value true. Therefore, the second set-of form in the partial method is replaced by this set-of form.

5. A successful application of the partial method. The application of the resulting partial method to the axioms, the theorem, the proof, and the pointer 4 produces the fourth proof step.
The replacement of the if form in the partial method by the if form in the method yields the method. If the argument

```
(same-set:  (variables (arg 2 (arg '(2 3) s)))
            (variables (arg 1 (arg '(2 3) s))))
``` is deleted before the argument

```
(subset:  (variables (arg 2 (arg '(2 3) s)))
          (variables (arg 1 (arg '(2 3) s))))
``` in the simplification stage for the second proof step, this subset: form is used instead of the same-set: form in the conjunction of the set-of form. The resulting partial method generates all proof steps of the proof so that a unification process is not required. If the lengths of the left and right sides of the axioms are compared instead of the set of variables in their left and right sides, the self-developing analysis procedure produces the argument

```
(equal:  (length (arg 2 (arg '(2 3) s)))
         (length (arg 1 (arg '(2 3) s))))
``` for the second proof step and the argument

```
(less:  (length (arg 2 (arg '(2 3) s)))
        (length (arg 1 (arg '(2 3) s)))).
``` for the third proof step. Then, the unification stage produces the disjunction of these arguments

```
(or (equal:  (length (arg 2 (arg '(2 3) s)))
             (length (arg 1 (arg '(2 3) s))))
    (less:   (length (arg 2 (arg '(2 3) s)))
             (length (arg 1 (arg '(2 3) s)))))
``` as an argument of the conjunction in the set-of form. The application of the analysis procedure to the proof obtained from the proof given above by exchanging the left and right sides of the equations and reversing the order of the proof steps yields a method that is similar to the method given above. These three variants of the proof analysis illustrate the robustness of the self-developing analysis procedure.

Applications of the method. The application of simple variations of the method to other axiom systems and other theorems of group theory which are usually contained in textbooks of higher mathematics, yields proofs of these theorems. Examples of such theorems are the theorem that a group contains only one identity element, that the inverse element of an element is unique, and that the inverse element of the inverse element is equal to the original element. Simple variations of the method are suitable for generating proofs of much more difficult theorems which can belong to other mathematical theories such as lattice theory (K. Ammon, "The Automatic Development of Concepts and Methods", Doctoral Dissertation, University of Hamburg, 1988). Some of these variations can automatically be generated by inserting arguments of conjunctions in set-of forms into the conjunctions of other set-of forms. Generally, such variations can be constructed on the basis of methods generated by an analysis of simple proofs.

An important aspect of the example of a self-developing computer system described above is that the method is a complete instruction, that is, a computer program. It consists of elementary complete instructions, that is, elementary programs such as the subset relation. This method is generated on the basis of these elementary programs and the domains and ranges of the functions these programs represent, that is, elementary meta-knowledge about these programs. Thus, a selfdeveloping computer system can generate elementary complete instructions and elementary meta-knowledge about these instructions which are not contained in the reflection base in the same way as it generates new special knowledge. This ability is very extensive if the reflection base contains a universal set of elementary complete instructions, from which all complete instructions can be composed, and elementary meta-knowledge about these instructions. It is known that the function determining whether a computer program maps the set of natural numbers into itself is not computable, that is, there is no fixed computer program representing this function. If the reflection base of a self-developing computer system contains a universal set of elementary complete instructions and elementary meta-knowledge about these instructions, the system can, as described above, generate computer programs mapping the set of natural numbers into itself. Thus, a self-developing computer system is able to determine functional values of non-computable functions in the same way as it generates new special knowledge.

The example described above is a simple self-developing computer system which illustrates essential processes in such a system. The set-of forms in the example are simple knowledge components. It does not contain division processes of existing knowledge components. Such processes can arise if a set-of form produces the proof step to be analyzed after the deletion of arguments in its conjunction. Because in this example axioms, theorems, and proofs are processed as general signals, which need not be completely coverable by theories, and the task to construct a proof represents the general task to construct signals, the self-developing analysis procedure can be used in other fields of application. The stages in this procedure such as elementary analysis, simplification, unification, and division can be interwoven into one another and more sophisticated for the analysis of complex signals.

Self-developing computer systems are able to generate proofs for significant theorems from higher mathematics. The representation of these theorems and proofs is similar to the ordinary representation of theorems and proofs in textbooks which uses natural language to a large extend. Proofs for the difficult theorem that, in a ring, $x^3=x$ implies the commutativity of multiplication and Banach's fixed point theorem, which is one of the most powerful theorems in higher analysis, can be generated on the basis of operators which are comparable to the set-of forms in the method described above and which can be constructed by an analysis of simple proofs (K. Ammon, "The Automatic Development of Concepts and Methods", Doctoral Dissertation, University of Hamburg, 1988; K. Ammon, "Discovering a proof for the fixed point theorem: A case study", Proceedings of the Eighth European Conference on Artifical Intelligence, Munich, August 1988, Pitman, London, England). The fact that proofs of these theorems can be generated on personal computers that are custumary in trade demonstrates the efficiency and economy of self-developing computer systems. Self-developing computer systems are user-friendly because their user interfaces need not be completely coverable by explicit theories and can be similar to the communication in natural language.

Self-developing computer systems are not limited to the particular form described, but on the contrary, the invention covers all modifications, equivalents, and alternatives falling within the spirit and scope of the invention as defined by the appended claims. A decisive aspect of a self-developing computer system is that it generates efficient new knowledge from more elementary knowledge. Apart from proofs, this knowledge can for example contain programs, methods, theories, physical objects, or the movements of robots. Another decisive aspect of such a system is that the processes generating new knowledge cannot completely be covered by a given explicit theory.

INDUSTRIAL APPLICABILITY

Potential fields of application of self-developing computer systems or processes are fields that cannot completely be covered by given explicit theories and thus require an automatic construction of new knowledge. The new knowledge originates from an analysis of a field of application and enables such a system or process to solve more difficult new problems. Examples of fields of application are the construction of proofs in knowledge-based systems, the construction of computer programs, or the control of the movements of robots.

APPENDIX

Definition 1. The arg function is a binary function whose first argument is a pointer (Definition 3) and whose second argument is a functional form, that is, a function and arguments for this function. The value of the form (arg'()x) is x and the value of (arg'(. . . n)x), where n is a natural number greater than or equal to zero, is the n-th argument of the value of (arg'(. . .)x), where the points represent the same sequence of numbers and the zeroth argument of a form is the name of the function in this form. Furthermore, (arg n x) stands for (arg'(n)x). Examples: The value of (arg'()'(f a b)) is (f a b), the value of (arg 0'(f a b)) is f, the value of (arg 1'(f a b)) is a, and the value of (arg'(2 1)'(f a(g b c))) is b.

Definition 2. The projection function is a binary function whose first argument is a pointer (Definition 3) and whose second argument is a functional form. It applies the arg function to the pointer in its first argument and the arguments of the form in its second argument which yields a set of objects. Example: The value of the form

```
(projection  '(1 2)
             (tuple   (pair (= a b) ...)
                      (pair (= c d) ...)))
``` is (set b d).

Definition 3. A pointer is (), a natural number greater than or equal to zero, or a list of natural numbers. Examples: (), 0, 1, 2, (0 1), (1 1), (2 1).

The invention claimed is:

1. A computer system having a memory for storing knowledge, obtaining input signals and generating output signals wherein said input signals and said output signals represent information, comprising:
   a reflection base for representing new knowledge, wherein said reflection base includes
      complete instructions which can be executed by processors of known type for providing components of new knowledge, and
      meta-knowledge about said complete instructions for constructing compositions of said complete instructions,
   special knowledge containing knowledge in a field of application for providing a basis for changing and extending said special knowledge itself,
   means for changing and extending said special knowledge from said input signals and said special knowledge itself, wherein said means for changing and extending said special knowledge includes
      means for constructing compositions of said complete instructions from said reflection base and said special knowledge, means for controlling the execution of said compositions of said complete instructions on the basis of said special knowledge, and means for generating components of the changed and extended special knowledge from parts of said special knowledge and parts of said compositions of said complete instructions, and the processes changing and extending said special knowledge cannot completely be covered by a given explicit theory; and means for generating said output signals with the aid of the changed and extended special knowledge.

2. A computer system as set forth in claim 1 wherein said special knowledge includes knowledge components containing knowledge in subfields of said field of application for providing a basis for changing and extending said special knowledge, and said means for changing and extending said special knowledge includes means for generating said knowledge components from said input signals and said compositions of said complete instructions, whereby special knowledge is generated in a division process for input signals for which no special knowledge is available.

3. A computer system as set forth in claim 1 wherein said special knowledge includes knowledge components containing knowledge in subfields of said field of application for providing a basis for changing and extending for providing a basis for changing and extending said special knowledge, and said means for changing and extending said special knowledge includes means for unifying said knowledge components.

4. A computer system as set forth in claim 1 wherein said means for changing and extending said special knowledge includes means for simplifying said special knowledge, whereby essential special knowledge is filtered out.

5. A computer system as set forth in claim 1 wherein said complete instructions in said reflection base include a universal set of said complete instructions from which all complete instructions can be composed, and said meta-knowledge in said reflection base includes meta-knowledge about said complete instructions in said universal set of said complete instructions.

6. A computer system as set forth in claim 1 wherein said means for changing and extending said special knowledge includes means for changing and extending said special knowledge in a feedback process on the basis of the changed and extended special knowledge.

7. A computer system as set forth in claim 1 wherein said means for changing and extending said special knowledge includes means for changing and extending said special knowledge in such a manner that the amount of the resources required for the application of the changed and extended special knowledge tends to decrease, whereby the change and extension of said special knowledge obeys the principle of economy.

8. A computer system as set forth in claim 1 wherein said means for changing and extending said special knowledge includes means for generating variations of said special knowledge and selecting the variations that have the greatest efficiency.

9. A computer system as set forth in claim 1 wherein said means for changing and extending said special knowledge includes means for analyzing failures in the application of said special knowledge and correcting said special knowledge so that said failures are avoided.

10. A computer system as set forth in claim 1 wherein said special knowledge contains values of non-computable functions and said means for changing and extending said special knowledge includes means for determining functional values of non-computable functions.

11. A computer system as set forth in claim 1 wherein said special knowledge includes said complete instructions in said reflection base and said meta-knowledge about said complete instructions in said reflection base, and said means for changing and extending said special knowledge changes and extends said complete instructions and said meta-knowledge about said complete instructions.

12. A computer system as set forth in claim 1 wherein said means for changing and extending said special knowledge includes means for changing and extending said special knowledge in a plurality of processes.

13. A computer system as set forth in claim 1 wherein said special knowledge includes compositions of said complete instructions in said reflection base for providing a basis for changing and extending said compositions of said complete instructions themselves, and said means for changing and extending said special knowledge changes and extends said compositions of said complete instructions.

14. A computer system as set forth in claim 1 wherein said means for changing and extending said special knowledge includes means for generating objects satisfying a description of said objects including means for producing a set of objects from said description and selecting said objects satisfying said description from said set of objects.

15. A process of operating a computer, obtaining input signals and generating output signals wherein said input signals and said output signals represent information, said computer having a memory for storing knowledge including a reflection base for representing new knowledge, wherein said reflection base includes complete instructions which can be executed by processors of known type for providing components of new knowledge, and meta-knowledge about said complete instructions for constructing compositions of said complete instructions, and special knowledge containing knowledge in a field of application for providing a basis for changing and extending said special knowledge itself, said process comprising the steps of:

changing and extending said special knowledge from said input signals and said special knowledge itself, wherein the step of changing and extending said special knowledge includes the steps of constructing compositions of said complete instructions from said reflection base and said special knowledge, controlling the execution of said compositions of said complete instructions on the basis of said special knowledge, and generating components of the changed and extended special knowledge from parts of said special knowledge and parts of said compositions of said complete instructions, and the processes changing and extending said special knowledge cannot completely be covered by a given explicit theory, and generating said output signals with the aid of the changed and extended special knowledge.

16. A process as set forth in claim 15 wherein said special knowledge includes knowledge components containing knowledge in subfields of said field of application for providing a basis for changing and extending said special knowledge, and the step of changing and extending said special knowledge includes the step of generating said knowledge components from said input signals and said compositions of said complete instructions, whereby special knowledge is generated in a division process for input signals for which no special knowledge is available.

17. A process as set forth in claim 15 wherein said special knowledge includes knowledge components containing knowledge in subfields of said field of application for providing a basis for changing and extending said special knowledge, and the step of changing and extending said special knowledge includes means for unifying said knowledge components.

18. A process as set forth in claim 15 wherein the step of changing and extending said special knowledge includes the step of simplifying said special knowledge, whereby essential special knowledge is filtered out.

19. A process as set forth in claim 15 wherein said complete instructions in said reflection base include a universal set of said complete instructions from which all complete instructions can be composed, and said meta-knowledge in said reflection base includes meta-knowledge about said complete instructions in said universal set of said complete instructions.

20. A process as set forth in claim 15 wherein the step of changing and extending said special knowledge includes the step of changing and extending said special knowledge in a feedback process on the basis of the changed and extended special knowledge.

21. A process as set forth in claim 15 wherein the step of changing and extending said special knowledge includes the step of changing and extending said special knowledge in such a manner that the amount of the resources required for the application of the changed and extended special knowledge tends to decrease, whereby the change and extension of said special knowledge obeys the principle of economy.

22. A process as set forth in claim 15 wherein the step of changing and extending said special knowledge includes the step of generating variations of said special knowledge and selecting the variations that have the greatest efficiency.

23. A process as set forth in claim 15 wherein the step of changing and extending said special knowledge includes the step of analyzing failures in the application of said special knowledge and correcting said special knowledge so that said failures are avoided.

24. A process as set forth in claim 15 wherein said special knowledge contains values of non-computable functions and the step of changing and extending said special knowledge includes the step of determining functional values of non-computable functions.

25. A process as set forth in claim 15 wherein said special knowledge includes said complete instructions in said reflection base and said meta-knowledge about said complete instructions in said reflection base, and the step of changing and extending said special knowledge changes and extends said complete instructions and said meta-knowledge about said complete instructions.

26. A process as set forth in claim 15 wherein the step of changing and extending said special knowledge includes the step of changing and extending said special knowledge in a plurality of processes.

27. A process as set forth in claim 15 wherein said special knowledge includes compositions of said complete instructions in said reflection base for providing a basis for changing and extending said compositions of said complete instructions themselves, and the step changing and extending said special knowledge changes and extends said compositions of said complete instructions.

28. A process as set forth in claim 15 wherein the step of changing and extending said special knowledge includes the step of generating objects satisfying a description of said objects including the steps of producing a set of objects from said description and selecting said objects satisfying said description from said set of objects.

* * * * *